United States Patent
Azegami

[11] Patent Number: 5,614,973
[45] Date of Patent: Mar. 25, 1997

[54] LENS BARRIER MECHANISM

[75] Inventor: Kazuyoshi Azegami, Tokyo, Japan

[73] Assignee: Asahi Kogaku Kogyo Kabushiki Kaisha, Tokyo, Japan

[21] Appl. No.: 348,861

[22] Filed: Nov. 28, 1994

[30]  Foreign Application Priority Data

Nov. 30, 1993  [JP]  Japan ................................. 5-064084
Nov. 30, 1993  [JP]  Japan ................................. 5-300005

[51] Int. Cl.⁶ ............................................... G03B 17/00
[52] U.S. Cl. .............................................. 396/448
[58] Field of Search .................................... 354/202, 265, 354/261, 252, 253

[56]  References Cited

U.S. PATENT DOCUMENTS

| | | |
|---|---|---|
| 3,580,156 | 5/1971 | Loseries . |
| 3,633,485 | 1/1972 | Hiruma . |
| 3,683,778 | 8/1972 | Weiss . |
| 3,918,076 | 11/1975 | Shono . |
| 3,978,503 | 8/1976 | Shono . |
| 4,752,796 | 6/1988 | Tsukahara et al. . |
| 4,876,563 | 10/1989 | Ishida et al. . |
| 4,944,030 | 7/1990 | Haraguchi et al. . |
| 4,989,027 | 1/1991 | Ishii et al. . |
| 5,033,819 | 7/1991 | Tanaka . |
| 5,040,017 | 8/1991 | Arai . |
| 5,130,730 | 7/1992 | Ishii et al. . |
| 5,136,315 | 8/1992 | Nomura . |
| 5,144,493 | 9/1992 | Nomura . |
| 5,159,372 | 10/1992 | Nomura et al. . |
| 5,214,462 | 5/1993 | Haraguchi et al. . |
| 5,262,898 | 11/1993 | Nomura . |
| 5,264,885 | 11/1993 | Haraguchi et al. . |
| 5,276,475 | 1/1994 | Haraguchi et al. . |
| 5,313,329 | 5/1994 | Ueda . |

FOREIGN PATENT DOCUMENTS

| | | |
|---|---|---|
| 0053922 | 6/1982 | European Pat. Off. . |
| 2645282 | 10/1990 | France . |
| 3531983 | 3/1986 | Germany . |
| 3809611 | 10/1988 | Germany . |
| 57-167016 | 10/1982 | Japan . |
| 1171430 | 12/1989 | Japan . |
| 2164470 | 3/1986 | United Kingdom . |
| 2202955 | 10/1988 | United Kingdom . |
| 2229010 | 9/1990 | United Kingdom . |

OTHER PUBLICATIONS

French Search Report.
Patent Abstract of Japan vol. 7, No. 10 (P-168)(1155) dated Jan. 14, 1983.

Primary Examiner—David M. Gray
Attorney, Agent, or Firm—Greenblum & Bernstein P.L.C.

[57]  ABSTRACT

A lens barrier mechanism of a photographing lens which opens and closes a lens opening of a lens unit, includes a plurality of blades at least partially superimposed upon one another in an optical axis direction of the lens unit. At least one of the plurality of blades is a leading blade to which a driving force is applied, and the other is a trailing blade or trailing blades driven by the leading blade. Each of the plurality of blades has an open and closed position with respect to the lens opening. Also included is a mechanism for driving the leading blade to move the same between open and closed positions, a first member formed on each of the leading blade and the trailing blades for moving the trailing blades from a closed position to an open position by a movement of the leading blade when the leading blade moves in the same direction, a second member formed on each of the leading blade and trailing blades for moving the trailing blades from open to closed positions by a movement of the leading blade when the leading blade moves in the same direction, and a closed position defining member for stopping the trailing blades at the closed position when the leading blade is moved from open to closed.

23 Claims, 2 Drawing Sheets

LENS BARRIER MECHANISM

BACKGROUND OF THE INVENTION

1. Field of the Invention

The present invention relates to a lens barrier mechanism for protecting the first lens of a lens system, as viewed from an object, such as a photographing lens system to prevent it from being scratched or damaged.

2. Description of the Related Art

Most recent lens shutter type cameras employ a lens barrier mechanism instead of a conventional lens cap for protecting the first objective lens, as viewed from an object, from being scratched or damaged. The lens barrier mechanism is integrally formed with the camera body or lens barrel, in front of the first objective lens as viewed from an object, and has at least one lens protecting blade which is inserted into and retracted from the photographing optical path to open and close a lens opening of a lens unit. In a lens barrier mechanism having a plurality of lens protecting blades pivoted about the same axis, it is necessary for each lens protecting blade to be positioned at its closed position and open position when the plurality of lens protecting blades close and open a lens opening, respectively. Hence, in addition to a member for supporting the plurality of lens protecting blades, a member for positioning each lens protecting blade must also be provided within a limited space, e.g., on a decorative plate on which a lens opening is formed at the center. This results in an increase in the cost of production. Moreover, it is necessary for the camera to have a space large enough to accommodate the above members. This results in an increase in the size of the camera.

In the case of a plurality of lens protecting blades pivoted about a common axis with the plurality of lens protecting blades aligned side by side along the photographing optical axis, when this plurality of lens protecting blades are driven to open and close a lens opening, it is likely that the blades will become worn by rubbing against each other, eventually creating too much play between the blades.

SUMMARY OF THE INVENTION

The primary object of the present invention is to provide a lens barrier mechanism which does not require the above-noted positioning member and make it possible to reduce the size of lens barrier mechanism and the cost of production.

Another object of the present invention is to provide a lens barrier mechanism which prevents the lens protecting blades from becoming worn and having too much play between the blades due to friction caused by the blades rubbing against each other.

According to one aspect of the present invention, there is provided a lens barrier mechanism which opens and closes a lens opening of a lens unit. The lens barrier mechanism includes: a plurality of blades at least partially superimposed upon one another in an optical axis direction of the lens unit, at least one of the plurality of blades being a leading blade to which a driving force is applied, the other being a trailing blade or trailing blades driven by the leading blade, wherein each of the plurality of blades having an open position and a closed position with respect to the lens opening; a mechanism for driving the leading blade to move the same between an open position and a closed position; a first member formed on each of the leading blade and trailing blades for moving the trailing blades from the closed position to the open position by a movement of the leading blade when the leading blade moves from the closed position to the open position; a second member formed on each of the leading blade and trailing blades for moving the trailing blades from the open position to respective the closed position by a movement of the leading blade when the leading blade moves from the open position to the closed position; and a closed position defining member for stopping the trailing blades at the closed position when the leading blade is moved from the open position to the closed position.

According to another aspect of the present invention, there is provided a lens barrier mechanism of a photographing lens having a lens opening at a front end of the photographing lens. The lens barrier mechanism includes: a supporting plate provided in a vicinity of the lens opening; and, a plurality of lens protecting blades aligned along an optical axis of the photographing lens and pivoted in a manner to be rotatable so as to move between an open position and a closed position of the lens opening. The lens opening is opened and closed by the plurality of lens protecting blades when the plurality of lens protecting blades are placed at the open position and the closed position, respectively. The closer one of the plurality of lens protecting blades is to the photographing lens, the shorter the length is of the one of the plurality of lens protecting blades. The supporting plate is provided with a guide member on which a free end of one of the plurality of lens protecting blades is slidably in contact with one of the plurality of lens protecting blades being closest to the photographing lens among the plurality of lens protecting blades.

The present disclosure relates to subject matter contained in Japanese Patent Application No. 05-300005 (filed on Nov. 30, 1993) and Japanese Utility Model Application No. 05-64084 (filed on Nov. 30, 1993) which are expressly incorporated herein by reference in their entireties.

BRIEF DESCRIPTION OF THE DRAWINGS

The present invention will be described in detail with reference to the accompanying drawings in which.

DETAILED DESCRIPTION OF PREFERRED EMBODIMENTS

Figure 1:
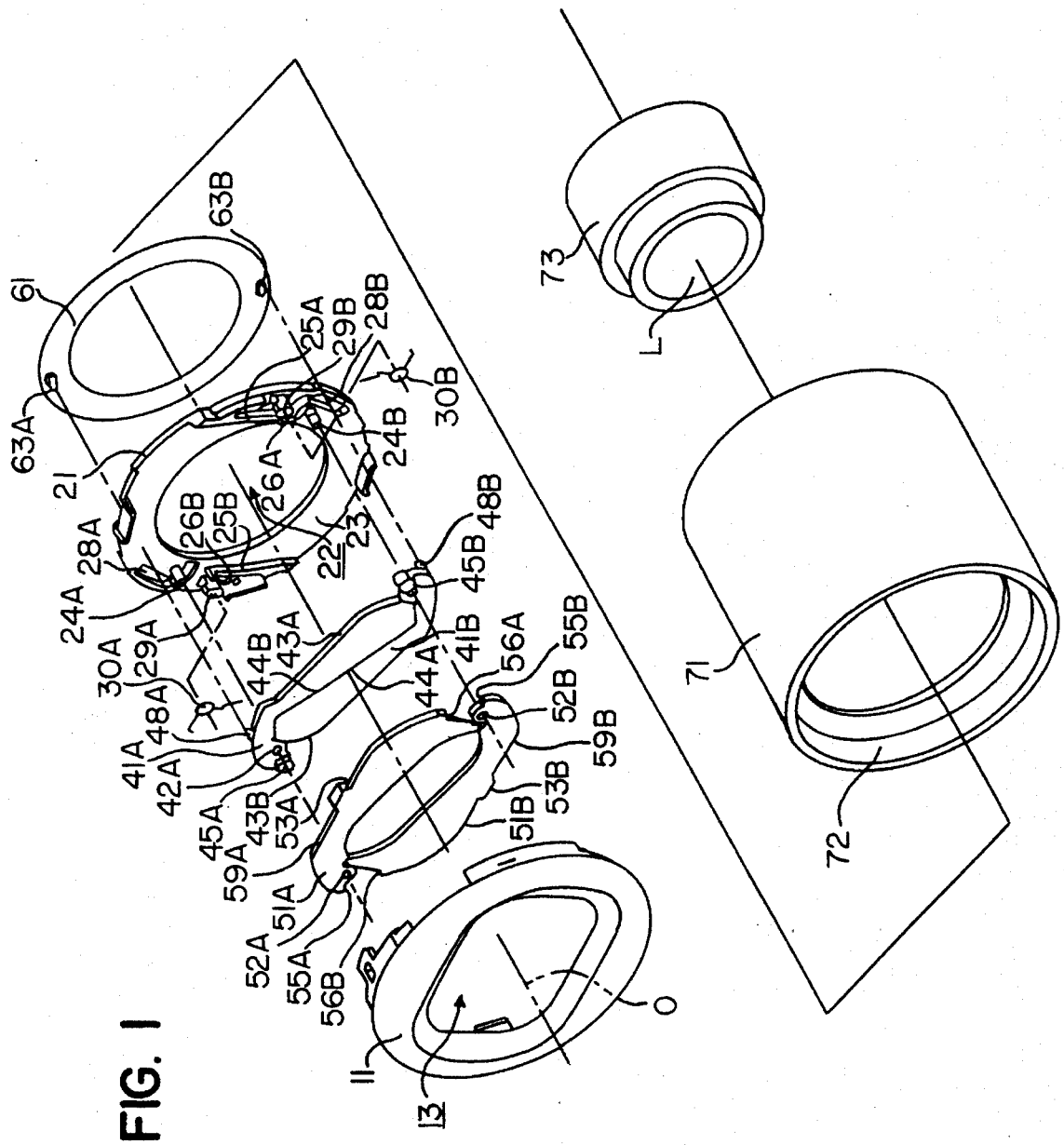
FIG. 1 is an exploded isometric view of a lens barrier mechanism according to an embodiment of the present invention.

In FIG. 1, a lens barrier mechanism of the present invention provided with two pairs of lens protecting blades is shown for a lens shutter type camera (not shown). The two pairs of lens protecting blades are placed symmetrically with respect to the optical axis O of a photographing lens, including a front lens group L. The other lens group or groups of the photographing lens is not shown in FIG. 1. Each pair consists of a pair of lens protecting blades aligned side by side along the optical axis O. The front lens group L, a lens barrel 71 and so forth, are placed behind the lens barrier mechanism (i.e., on the camera body side which is the right side of FIG. 1).

The front lens group L is supported by a conventional type AF/AE shutter unit 73 and is moved in the optical axis direction 0 by the AF/AE shutter unit 73.

A decorative plate 11 fixed to the front end portion 72 of a lens barrel 71 is provided with a lens opening 13, which defines the incident angle and size of incident light of an object to be photographed. A supporting plate 21 is fixed to the rear surface of the decorative plate 11 and fitted in the front end portion 72. A space large enough to accommodate two pairs of lens protecting blades 41 and 51 (i.e., 41a, 41b, 51a, and 51b) is provided between the decorative plate 11 and the supporting plate 21. The first pair of lens protecting blades consists of a leading blade 41a and a trailing blade 51a. The second pair consists of a leading blade 41b and a trailing blade 51b. The supporting plate 21 is provided with a circular opening 22 with the center thereof coincident with the optical axis O. The supporting plate 21 is also provided on the front surface 23 thereof with pivots 24a and 24b on which the blades 41 and 51 are rotatably supported. The pivots 24a and 24b are placed symmetrically with respect to the optical axis O on the front surface 23.

The leading blade 41a and trailing blade 51a are rotatably supported on the pivot 24a, and the leading blade 41b and trailing blade 51b are rotatably supported on the pivot 24b. The leading blades 41a and 41b are placed behind the trailing blades 51a and 51b in the direction of the optical axis O, with respect to each other. Each of the blades 41a, 41b, 51a, and 51b is formed to move to two predetermined positions, i.e., a closed position and an opened position, when the lens opening 13 is closed and opened by the blades 41a, 41b, 51a, and 51b, respectively.

The leading blades 41a and 41b are formed to have the same shape. Likewise, the trailing blades 51a and 51b are formed to have the same shape. For this design, in the description below with respect to the blades 41a, 41b, 51a, and 51b, their corresponding parts or members are designated by the same numerals, and an "a" or "b" added to the numerals shows which parts or members belong to which blades. For instance, an opposing edge 44a is formed on the leading blade 41a; and accordingly, an opposing edge 44b corresponding to the opposing edge 44a is formed on the leading blade 41b. As for the supporting plate 21, since a plurality of pairs or members are formed on the front surface 23 thereof, in two groups symmetrically with respect to the optical axis O, corresponding parts or members formed on the front surface 23 are designated by the same numerals, and an "a" or "b" added to the numerals shows which parts or members belong to which of the two groups. In the description below with respect to the blades 41a, 41b, 51a, 51b, and the supporting plate 21, in the case where an "a" or "b" is not added after the numerals, it means that both corresponding parts or members are designated by the same numerals. For instance, a sentence below says, "The free end of the leading blades 41 is supported by the front surface 23.", which means that the free end of the leading blade 41a is supported by the front surface 23 and that the free end of the leading blade 41b is supported by the front surface 23.

The first pair of lens protecting blades 41a and 51a and the second pair of lens protecting blades 41b and 51b are provided with pivotal holes 42a, 52a, 42b, and 52b formed at one of the end portions of the blades 41a, 51a, 41b, and 51b, respectively. The first pair of lens protecting blades 41a and 51a and the second pair of lens protecting blades 41b and 51b are aligned along the optical axis O with the pivotal holes 42a and 52a, and 42b and 52b engaging the pivots 24a and 24b, respectively. The blades 41a and 51a are rotatably supported on the pivot 24a, and the blades 41b and 51b are rotatably supported on the pivot 24b.

The free ends of the leading blades 41a and 41b come into contact with the front surface 23 of the supporting plate 21, with the free ends slidable on the front surface 23.

The free ends of the trailing blades 51a and 51b come in contact with guide ribs 25a and 25b, with the free ends slidable on the guide ribs 25a and 25b. The guide ribs 25a and 25b are each in the shape of an arc and are formed on the front surface 23. It can be seen from the above-noted structures that the free end of the leading blades 41 is supported on the front surface 23 of the supporting plate 21 and that the free end of the trailing blades 51 is supported on the guide rib 25 of the supporting plate 21.

Provided that the length from the axis of the pivots 24 to the free end of the leading blades 41 is "r", that the length from the axis of the pivots 24 to the free end of the trailing blades 51 is "R", and that the length from the axis of the pivots 24 to the inner side walls 27 of the guide ribs 25 is "R1", the following relationship is satisfied:

$$r < R1 < R \qquad (1)$$

Projections 29a and 29b are formed adjacent to the pivots 24a and 24b on the front surface 23 of the supporting plate 21, respectively. The leading blades 41a and 41b are biased toward their closed positions by the torsion springs 30a and 30b whose coiled members fit on the projections 29a and 29b, respectively.

Figure 2:
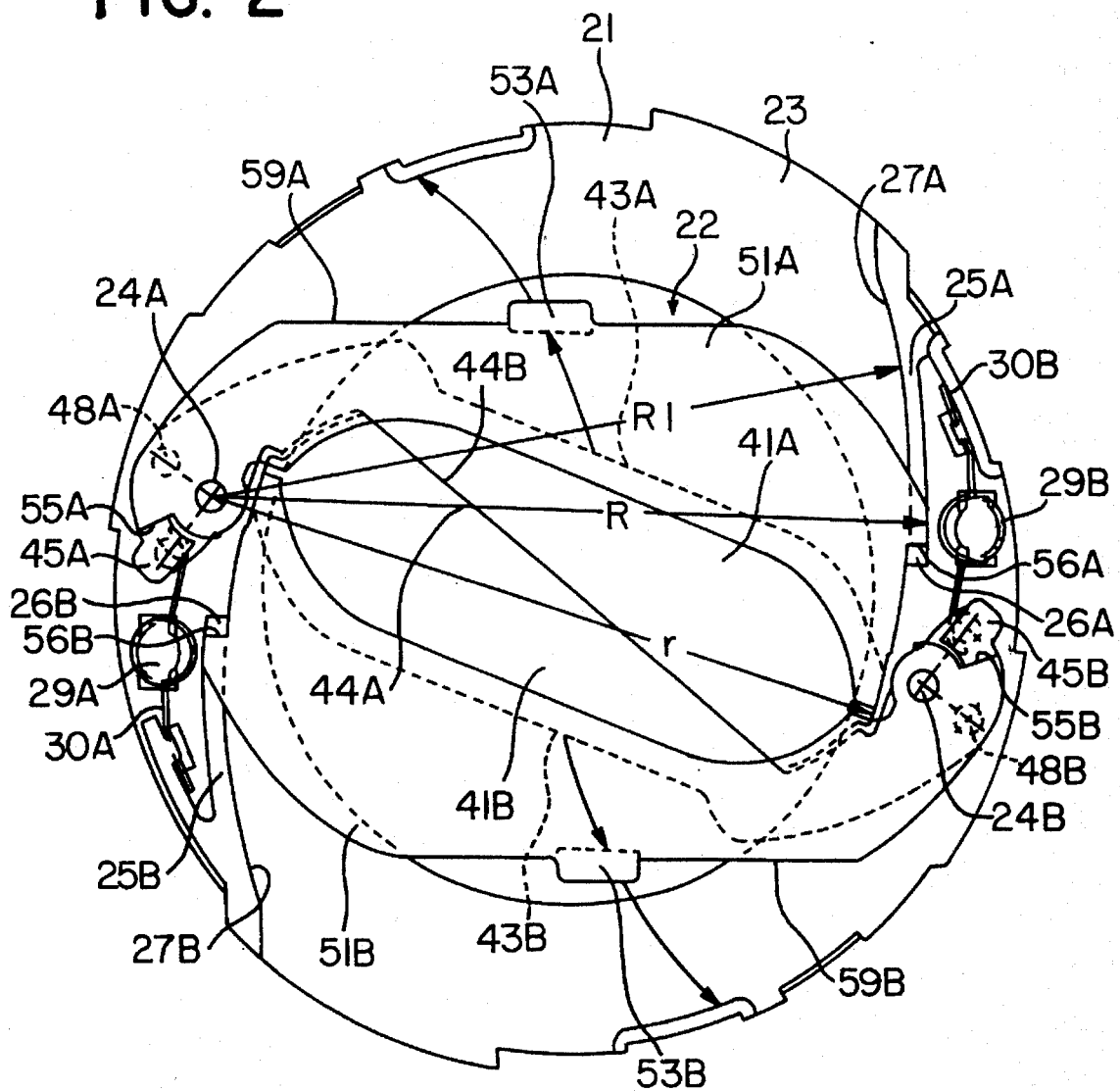
FIG. 2 is a front elevational view of the lens barrier mechanism shown in FIG. 1, excluding the decorative plate thereof; and, FIG. 3 is a cross-sectional view of a part of the lens barrier mechanism, showing a structure for supporting free ends of the lens supporting blades.

Pins 48a and 48b projecting toward the supporting plate 21 are formed adjacent to the pivotal holes 42a and 42b on the leading blades 41a and 41b. The pins 48a and 48b pass through openings 28a and 28b formed on the supporting plate 21. A drive ring 61 is placed behind the supporting ring 21. The drive plate 61 rotates about the optical axis O to move the blades 41 and 51 and is provided with projections 63a and 63b formed thereon. The projections 63a and 63b engage the pins 48a and 48b so that the drive ring 61 can move the leading blades 41a and 41b toward their open positions against the elastic force of the torsion springs 30a and 30b, respectively. The drive ring 61 rotates about the optical axis O in the opening direction thereof (i.e., the counterclockwise direction in FIG. 2) to move the leading blades 41a and 41b toward their open positions by means of the projections 63a and 63b pushing the pins 48a and 48b against the elastic force of the torsion springs 30a and 30b when the main switch of the camera (not shown) is turned ON. When the main switch of the camera is turned OFF, the drive ring 61 rotates about the optical axis O in the closing direction thereof (i.e., the clockwise direction in FIG. 2). Due to this rotation, since the projections 63a and 63b are apart from the pins 48a and 48b, the leading blades 41a and 41b are moved toward their closed positions by the elastic force of the torsion springs 30a and 30b, respectively. A mechanism for driving the lens barrier mechanism of this embodiment is of a well-known type and is therefore not illustrated.

When the drive ring 61 rotates in its opening direction, since the projections 63a and 63b push the pins 48a and 48b, the leading blades 41a and 41b rotate in the direction toward their open positions against the elastic force of the torsion springs 30a and 30b. Due to this rotation, projections 45a and 45b of the leading blades 41a and 41b are apart from abutting members 55a and 55b of the trailing blades 51a and 51b, respectively. The projections 45a and 45b are formed projecting toward the decorative plate 11 on the leading blades 41a and 41b adjacent to the pivotal holes 42a and 42b, respectively. The abutting members 55a and 55b are formed on the trailing blades 51a and 51b adjacent to the pivotal holes 52a and 52b, respectively. The projections 45a and 45b come into contact with the abutting members 55a and 55b when the leading and trailing blades 41 and 51 are at their closed positions, respectively. On the other hand, when the leading blades 41a and 41b rotate in the direction toward their open positions, in the case that the frictional force occurring between the leading blades 41 and the trailing blade 51 is larger than the maximum static frictional force occurring between the trailing blades 51 and the guide ribs 25, the trailing blades 51a and 51b are rotated in the direction toward their opened positions by the former frictional force. If this is not the case, the trailing blades 51a and 51b are not rotated but stay at their closed positions.

When the trailing blades 51a and 51b are at their closed positions, these positions are defined by abutting members (i.e., closed position defining members) 56a and 56b contacting projections 26a and 26b (i.e., closed position defining members). The abutting members 56a and 56b are formed on the free ends of the trailing blades 51a and 51b, and the projections 26a and 26b are formed on one of the ends of the guide ribs 25a and 25b, respectively. In this state, the projections 45a and 45b of the leading blades 41a and 41b contact the abutting members 55a and 55b of the trailing blades 51a and 51b, respectively. Accordingly, the closed positions of the leading blades 41a and 41b are defined by the engagement between the projections 45 and the abutting members 55, and between the abutting members 56 and the projections 26. When the leading blades 41a and 41b are at their closed positions, inner edges 44a and 44b of the leading blades 41a and 41b opposing each other come into contact with each other to close the lens opening 13.

Once the drive ring 61 stops restricting the movement of the leading blades 41a and 41b, the leading blades 41a and 41b rotate in the direction towards their respective open positions by the elastic force of the torsion springs 30a and 30b, respectively. Due to this rotation, the projections 45a and 45b are apart from the abutting members 55a and 55b. At this moment, in the case where the frictional force occurring between the leading blades 41 and the trailing blades 51 is larger than the maximum static frictional force occurring between the trailing blade 51 and the guide ribs 25, the trailing blades 51a and 51b are rotated in the direction towards their respective open positions by the frictional force. If this is not the case, the trailing blades 51a and 51b are not rotated but stay at their closed positions.

When the leading blades 41a and 41b rotate in the direction toward their open positions by a predetermined amount, outer edges 43a and 43b of the leading blades 41a and 41b come into contact with projections 53a and 53b formed on outer edges 59a and 59b of the trailing blades 51a and 51b, respectively. The projections 53a and 53b are formed to extend rearwards by a predetermined amount. Thereafter, the leading blades 41a and 41b and the trailing blades 51a and 51b rotate in the direction toward their open positions with the leading blades 41a and 41b and the trailing blades 51a and 51b aligned along the optical axis O, respectively.

When the drive ring 61 stops rotating in the opening direction thereof, the first and second pairs of lens protecting blades 41a and 51a and 41b and 51b stop moving. The rotation of the drive ring 61 is controlled in a manner such that the drive ring 61 stops rotating in the opening direction at the moment the first and second pairs of lens protecting blades 41 and 51 have reached their open positions. At the open positions, the first and second pairs of lens protecting blades 41a and 51a and 41b and 51b are maintained to stay at their open positions against the elastic force of the torsion springs 30a and 30b the lens opening 13 is kept open.

The movement of the blades 41 and 51 from their open positions to closed positions is as follows. When the drive ring 61 rotates in the closing direction, the leading blades 41a and 41b rotate in the direction toward their close positions through the pins 48a and 48b, respectively. Due to this rotation, since the force pushing the leading blades 41a and 41b toward their open positions against the elastic force of the torsion springs 30a and 30b is gone, the leading blades 41a and 41b are rotated in the direction toward their closed positions by the elastic force of the torsion springs 30a and 30b.

After the leading blades 41a and 41b rotate in the direction toward their closed positions by a certain amount, the projections 45a and 45b come into contact with the abutting members 55a and 55b at the moment the outer edges 43a and 43b of the leading blades 41a and 41b have slightly overlapped the trailing blades 51a and 51b. Thereafter, the trailing blades 51a and 51b rotate together with the leading blades 41a and 41b with the outer edges 43a and 43b of the leading blades 41a and 41b slightly overlapping the trailing blades 51a and 51b.

After the leading blades 41a and 41b further rotate in the direction toward their closed positions, the abutting members 56a and 56b come into contact with the projections 26a and 26b, thereby the trailing blades 51a and 51b stop rotating in the direction toward their closed positions. Accordingly, the leading blades 41a and 41b also stop rotating by the engagement between the projections 45a and 45b and the abutting members 55a and 55b. At these positions, when the leading blades 41a and 41b stop rotating, the outer edges 43a and 43b slightly overlap the trailing blades 51a and 51b, while the inner edge 44a contacts the inner edge 44b. Accordingly, the lens opening 13 is completely closed by the leading blades 41a and 41b and the trailing blades 51a and 51b.

As can be seen from the above, the closed positions of the leading blades 41a and 41b and of the trailing blades 51a and 51b are defined by the restrictions in rotation in the direction toward their closed positions that are made by the engagements between the projections 45a and 45b and the abutting members 55a and 55b, and between the abutting members 56a and 56b and the projections 26a and 26b. the leading blades 41a and 41b and the trailing blades 51a and 51b are maintained at their closed positions by the elastic force of the torsion springs 30a and 30b, thereby the first objective lens of the camera, viewed from an object, is protected from being scratched or damaged.

Figure 3:
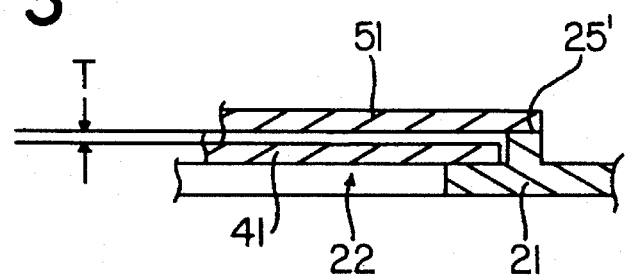

FIG. 3 shows another embodiment of the present invention. A guide rib 25' is formed in a manner such that the thickness thereof is thicker than that of the leading blade 41 so that the leading blade 41 and the trailing blade 51 may not slidably contact each other. In order to keep the leading blade 41 and the trailing blade 51 parallel to each other, a spacer (not shown) may be placed between the pivoted ends of the blades 41 and 51, or the pivotal holes 42 and 52 are provided with a boss (not shown), so that the difference between the thickness of the leading blade 41 and the thickness of the guide rib 251 is compensated.

If the distance "R" of the trailing blade 51 is set larger than the distance "r" of the leading blade 41, the free end of the trailing blade 51 is slidably supported on the guide rib 25', and a space or gap "t" is formed between the leading blade 41 and the trailing blade 51, and the leading blade 41 and the trailing blade 51 do not contact each other. Furthermore, the free ends of the leading and trailing blades 41 and 51 are each independently supported by the front surface 23 and the guide rib 25', respectively. Thereby the strength of the blades 41 and 51 against an external force is increased and the occurrence of too much play due to wear of the blades 41 and 51 is prevented.

Although the lens barrier mechanism of the above embodiment includes the first pair of lens protecting blades and the second pair of lens protecting blades, four blades altogether, each pair may be comprised of more than two blades. In that case, the closer a blade of each pair is to the film side, the shorter the length of the blade is required. Furthermore, more than one guide rib for each pair is formed to correspond to both blades of each pair, and, the distance from the pivotal axis to the inner side wall of a guide rib and the thickness thereof are made shorter than those of another guide rib which is placed farther away from the optical axis.

As can be seen from the foregoing, according to the present invention, when the leading blades 41a and 41b and the trailing blades 51a and 51b together close the lens opening 13, the leading blades 41a and 41b are maintained at their closed positions together with the trailing blades 51a and 51b at their closed positions, without it being necessary to provide a positioning member on the supporting plate 21 to make the leading blades 41a and 41b stop at their closed positions. Although the projections 26a and 26b are formed on the supporting plate 21 in the above embodiment, the projections 26a and 26b may be formed on the decorative plate 11.

As can be seen from the foregoing, according to the present invention, since the leading blades and the trailing blades are each provided with a members for moving the trailing blades from the open position to the closed position, by contacting projecting members on the leading blades with the abutting members on the trailing blades in the course of the movement of the leading blades from the open position to the closed position, and further since the leading blades and the trailing blades are each provided with closed position defining members which makes the trailing blades stop at the closed position so as to also stop the leading blades together with the trailing blades, it is not necessary for each blade to be separately provided with positioning members for the purpose of being stopped at the respective closed position, which contributes to making the lens small and compact and decreasing the cost of production of the lens.

As can be seen from the foregoing, according to the present invention, since there are provided a plurality of pivoted blades which are aligned along the optical axis, since the closer a blade is placed to the film side, the shorter the length of the blade from its rotational axis to the free end of the blade is required, and further since there is provided a guide member on which the free end of a blade is slidably supported with the free end not in contact with the other blades, the strength of the blades to resist external forces is increased and the occurrence of too much play due to wear of the blades on each other is prevented.

I claim:

1. A lens barrier mechanism which opens and closes a lens opening for protecting a photographing lens in a lens unit, comprising:

a pivot provided on a barrier supporting plate;

two pairs of lens protecting barrier blades, each of said two pairs of lens protecting barrier blades comprising a leading blade and a trailing blade, said leading blade and said trailing blade rotatably supported coaxially about said pivot, and said leading blade and said trailing blade partially superimposed in an optical axis direction of said lens unit; and means for pivotally moving said leading blade between a closed position and an open position with respect to said lens opening, wherein, when said leading blade is moved by said moving means, said trailing blade is moved between said closed position and said open position.

2. The lens barrier mechanism of claim 1, wherein a free end of said leading blade is supported by a front surface of said barrier supporting plate.

3. The lens barrier mechanism of claim 2, wherein said free end of said leading blade is slidable on said front surface of said barrier supporting plate.

4. The lens barrier mechanism of claim 1, further comprising a spring member for biasing said leading blade towards said closed position.

5. The lens barrier mechanism of claim 4, wherein said moving means moves said leading blade against a biasing force of said spring member.

6. The lens barrier mechanism of claim 5, said moving means comprising a drive ring having a projection, said leading blade further comprising a pin, wherein when said drive ring is rotated about the optical axis of said lens unit, said projection contacts said pin to move said leading blade toward said open position.

7. The lens barrier mechanism of claim 1, said barrier supporting plate comprising a guide member with which a free end of said trailing blade is slidably in contact.

8. The lens barrier mechanism of claim 1, said pair of lens protecting barrier blades positioned in front of said photographing lens when viewed along the optical axis towards said photographing lens.

9. A lens barrier mechanism which opens and closes a lens opening for protecting a photographing lens of a lens unit, comprising:

a pair of pivots provided on a barrier supporting plate;

two groups of lens protecting barrier blades, each of said two groups of lens protecting barrier blades comprising a leading blade and a trailing blade, each said leading blade and each said trailing blade rotatably supported coaxially about one of said pair of pivots, each said leading blade and each said trailing blade partially superimposed in an optical axis direction of said lens unit, each said leading blade and each said trailing blade having an open position and a closed position;

means for transmitting a movement of each said leading blade to each said trailing blade when each said leading blade is moved from said closed position to said open position such that each said trailing blade is moved from said closed position to said open position;

means for stopping each said leading blade when each said leading blade is moved from said open position to said closed position; and means for stopping each said trailing blade when each said trailing blade is moved from said open position to said closed position, wherein said trailing blade stopping means is provided between said barrier supporting plate and each said trailing blade, and wherein said leading blade stopping means is provided between each said leading blade and each said trailing blade.

10. The lens barrier mechanism of claim 9, wherein a free end of said leading blade is supported by a front surface of said barrier supporting plate.

11. The lens barrier mechanism of claim 10, wherein said free end of said leading blade is slidable on said front surface of said barrier supporting plate.

12. The lens barrier mechanism of claim 9, further comprising a spring member for biasing said leading blade towards said closed position.

13. The lens barrier mechanism of claim 12, said transmitting means moving said leading blade against a biasing force of said spring member.

14. The lens barrier mechanism of claim 13, said transmitting means comprising a drive ring having a projection, said leading plate further comprising a pin, wherein, when said drive ring is rotated about the optical axis of said lens unit said projection contacts said pin to move said leading blade toward said open position, and wherein said leading blade is fictionally engaged to said trailing blade such that when leading blade is moved, said trailing blade is moved.

15. The lens barrier mechanism of claim 9, said barrier supporting plate comprising a guide member on which a free end of said trailing blade is slidably in contact.

16. The lens barrier of claim 9, said trailing blade stopping means comprising an abutting member formed on said trailing blade proximate to said one of said pair of pivots, and said leading blade stopping means comprising a projection formed on said leading blade proximate to said one of said pair of pivots, wherein said projection contacts said abutting member when said leading blade and said trailing blade are in said closed position.

17. The lens barrier mechanism of claim 9, said pair of lens protecting barrier blades positioned in front of said photographing lens when viewed along the optical axis towards said photographing lens.

18. A lens barrier mechanism which opens and closes a lens opening for protecting a photographing lens of a lens unit, comprising:

a pivot provided on a barrier supporting plate; and a plurality of protective blades coaxially rotatably supported on said pivot, one of said plurality of protective blades being further from said photographing lens than another of said plurality of protective blades, each of said blades being partially superimposed in an optical axis direction of said lens unit, wherein each of said plurality of protective blades has an open position and a closed position with respect to said lens opening, and said plurality of protective blades are pivotally moved between said open position and said closed position, and wherein the closer a blade is to said photographing lens along the optical axis, the shorter a distance between said pivot and a free end of said blade, and wherein the free end of said one of said plurality of protective blades further from said photographing lens slidably contacts a guide surface provided on said barrier supporting plate.

19. The lens barrier mechanism of claim 18, wherein a free end of said another one of said plurality of protective blades is supported by a front surface of said barrier supporting plate.

20. The lens barrier mechanism of claim 19, wherein said free end of said another one of said plurality of protective blades is slidable on said front surface of said barrier supporting plate.

21. The lens barrier mechanism of claim 18, further comprising a spring member for biasing said one of said plurality of protective blades closer to said photographing lens towards said closed position.

22. The lens barrier mechanism of claim 18, further comprising means for driving at least said one of said plurality of protective blades closer to said photographing lens from a closed position to an open position.

23. The lens barrier mechanism of claim 18, said plurality of protective blades positioned in front of said photographing lens when viewed along the optical axis towards said photographing lens.

* * * * *